(12) United States Patent
Kennedy

(10) Patent No.: US 9,424,278 B2
(45) Date of Patent: *Aug. 23, 2016

(54) METHODS OF SEARCHING PUBLIC INFORMATION FOR SALES LEADS

(71) Applicant: Benjamin J Kennedy, Santa Barbara, CA (US)

(72) Inventor: Benjamin J Kennedy, Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/738,873

(22) Filed: Jun. 13, 2015

(65) Prior Publication Data

US 2015/0278832 A1   Oct. 1, 2015

Related U.S. Application Data

(63) Continuation of application No. 12/202,893, filed on Sep. 2, 2008, now Pat. No. 9,087,254.

(60) Provisional application No. 60/967,153, filed on Aug. 31, 2007.

(51) Int. Cl.
*G06F 17/30* (2006.01)
*G06K 9/20* (2006.01)

(52) U.S. Cl.
CPC ...... *G06F 17/30265* (2013.01); *G06F 17/3089* (2013.01); *G06F 17/30864* (2013.01); *G06F 17/30908* (2013.01); *G06F 17/30979* (2013.01); *G06K 9/2054* (2013.01)

(58) Field of Classification Search
None
See application file for complete search history.

(56) References Cited

U.S. PATENT DOCUMENTS

| | | | |
|---|---|---|---|
| 5,521,815 A | 5/1996 | Rose, Jr. | |
| 5,987,464 A | 11/1999 | Schneider | |
| 6,026,397 A | 2/2000 | Sheppard | |
| 6,112,190 A | 8/2000 | Fletcher | |
| 6,237,009 B1 | 5/2001 | Waldo | |
| 6,578,009 B1 | 6/2003 | Shinozaki | |
| 6,785,658 B1 | 8/2004 | Merker | |
| 6,850,902 B1 | 2/2005 | Finch | |

(Continued)

OTHER PUBLICATIONS

California Secretary of State UCC Connect Web Portal (https://uc-cconnect.sos.ca.gov/acct/acct-login.asp)—© 2004.

(Continued)

*Primary Examiner* — Son T Hoang
(74) *Attorney, Agent, or Firm* — Guy Cumberbatch

(57) ABSTRACT

A system and method of identifying UCC Financing Statements by productive asset type, which is useful in identifying prospects for companies that are involved in the distribution, sales, and financing of productive assets. The present invention allows the user of the invention to search UCC financing statements by brand and/or type of equipment that is used as collateral. Using a lead generation technique that involves analyzing and correlating collateral information to UCC financing statements, the statements can be identified and categorized by collateral type. By processing electronic collateral information, as well as an OCR process that converts text contained in images into searchable text. There is also a direct data entry method of gathering collateral information. This collateral information is then used in an innovative relational database. Also, the proposed invention categorizes UCC financing statements by collateral type using a method of querying specific equipment type keywords, such as equipment names and brand names. Also, the proposed invention merges UCC addendums and amendments allowing the user to view the most current UCC financing information without looking at multiple filings.

20 Claims, 13 Drawing Sheets

(56) References Cited

U.S. PATENT DOCUMENTS

| | | | |
|---|---|---|---|
| 6,868,389 B1 | 3/2005 | Wilkins | |
| 6,879,990 B1 | 4/2005 | Boyer | |
| 6,993,515 B2 | 1/2006 | Chender | |
| 7,050,982 B2 | 5/2006 | Sheinson | |
| 7,155,414 B2 | 12/2006 | Barritz | |
| 2002/0059131 A1* | 5/2002 | Goodwin | G06Q 30/08 705/37 |
| 2003/0177100 A1* | 9/2003 | Filatov | G06K 9/723 705/64 |
| 2004/0205526 A1* | 10/2004 | Borodovski | G06F 17/243 715/224 |
| 2004/0260636 A1 | 12/2004 | Marceau | |
| 2005/0137904 A1* | 6/2005 | Lane | G06Q 50/16 235/375 |
| 2000/5015462 | 7/2005 | Eckart | |
| 2006/0041538 A1* | 2/2006 | King | H04N 1/00244 |
| 2006/0190490 A1 | 8/2006 | Ritchey | |
| 2006/0271450 A1* | 11/2006 | Cohen | G06Q 10/10 705/30 |
| 2007/0094107 A1* | 4/2007 | Franklin | G06Q 40/08 705/30 |
| 2007/0124312 A1 | 5/2007 | Simpson | |
| 2008/0126358 A1* | 5/2008 | Turner | G06F 17/30867 |
| 2008/0243568 A1 | 10/2008 | Smith | |

OTHER PUBLICATIONS

Dun & Bradstreet, Inc. (http://www.dnb.com/us/)—General business database providing limited UCC information—© 2000-2009.
Salesgenie.com (www.salesgenie.com)—General business database providing limited UCC information—© 2009.
CT Lien Solutions Website (http://www.uccdirect.com/products/search.aspx)—General business database providing retrieval of UCC filing information—© 2009.
Equipment Data Associates (EDA) (www.edadata.com/copiers.html)—© 2008.

* cited by examiner

UCC FINANCING STATEMENT
FOLLOW INSTRUCTIONS (front and back) CAREFULLY

| A. NAME & PHONE OF CONTACT AT FILER |
|---|
| B. SEND ACKNOWLEDGEMENT TO: |

ABOVE SPACE IS FOR FILING OFFICE USE ONLY

1. DEBTOR'S EXACT FULL LEGAL NAME
   a. ORGANIZATION'S NAME

OR

| b. INDIVIDUAL'S LAST NAME | FIRST NAME | MIDDLE NAME | |
|---|---|---|---|
| c. MAILING ADDRESS | CITY | STATE | POSTAL CODE | COUNTRY |
| TAX ID/SS # | ADD'L INFO | ORG. TYPE | ORG. JURISDICTION | ORGANIZATION ID ☐ NONE |

2. ADDITIONAL DEBTOR'S EXACT FULL LEGAL NAME
   a. ORGANIZATION'S NAME

OR

| b. INDIVIDUAL'S LAST NAME | FIRST NAME | MIDDLE NAME | |
|---|---|---|---|
| c. MAILING ADDRESS | CITY | STATE | POSTAL CODE | COUNTRY |
| TAX ID/SS # | ADD'L INFO | ORG. TYPE | ORG. JURISDICTION | ORGANIZATION ID ☐ NONE |

3. SECURED PARTY'S NAME
   a. ORGANIZATION'S NAME

OR

| b. INDIVIDUAL'S LAST NAME | FIRST NAME | MIDDLE NAME | |
|---|---|---|---|
| c. MAILING ADDRESS | CITY | STATE | POSTAL CODE | COUNTRY |

4. This FINANCING STATEMENT covers the following collateral:

5. ALTERNATIVE DESIGNATION
6. This FINANCING STATEMENT is to be filed [for record] (or record) in the REAL ESTATE RECORDS. Attach Addendum
8. OPTIONAL FILER REFERENCE DATA

FIG. 2a

UCC FINANCING STATEMENT ADDENDUM
FOLLOW INSTRUCTIONS (front and back) CAREFULLY 9. NAME OF FIRST DEBTOR (1a or 1b) ON RELATED FINANCING STATEMENT
  a. ORGANIZATIONS'S NAME OR
  b. INDIVIDUAL'S LAST NAME | FIRST NAME | MIDDLE NAME

10. MISCELLANEOUS

ABOVE SPACE IS FOR FILING OFFICE USE ONLY

11. ADD'L DEBTOR'S EXACT FULL LEGAL NAME (11a or 11b)
  a. ORGANIZATIONS'S NAME

OR
  b. INDIVIDUAL'S LAST NAME | FIRST NAME | MIDDLE NAME
  c. MAILING ADDRESS | CITY | STATE | POSTAL CODE | COUNTRY

TAX ID/SS # | ADD'L INFO | ORG. TYPE | ORG. JURISDICTION | ORGANIZATION ID | ☐ NONE

12. ADD'L SECURED PARTY'S or ASSIGNOR S/P'S NAME (12a or 12b)
  a. ORGANIZATIONS'S NAME

OR
  b. INDIVIDUAL'S LAST NAME | FIRST NAME | MIDDLE NAME
  c. MAILING ADDRESS | CITY | STATE | POSTAL CODE | COUNTRY

13. This FINANCING STATEMENT covers ___ timber to be cut or ___ as-extracted collateral, or is filed as a ___ fixture filing.

14. Description of real estate:

15. Name and address of a RECORD OWNER of above-described real estate

16. Additional collateral description:

17. Check only if applicable and check only one box.
Debtor is a ___ Trust or ___ Trustee acting with respect to property held in trust or ___ Decedent's Estate 18. Check only if applicable and check only one box.
☐ Debtor is a TRANSMITTING UTILITY
☐ Filed in connection with a Manufactured-Home Transaction
☐ Filed in connection with a Public-Finance Transaction

FIG. 2b

UCC FINANCING STATEMENT AMENDMENT
FOLLOW INSTRUCTIONS (front and back) CAREFULLY

| A. NAME & PHONE OF CONTACT AT FILER |
|---|
| B. SEND ACKNOWLEDGEMENT TO: |

ABOVE SPACE IS FOR FILING OFFICE USE ONLY

1a. INITIAL FINANCING STATEMENT FILE #     1b. FILED IN REAL ESTATE RECORDS?

2. TERMINATION

3. CONTINUATION

4. ASSIGNMENT (full or partial)

5. AMENDMENT (PARTY INFORMATION)

6. CURRENT RECORD INFORMATION
   a. ORGANIZATION'S NAME

OR b. INDIVIDUAL'S LAST NAME    FIRST NAME    MIDDLE NAME

7. CHANGED (NEW) OR ADDED INFORMATION
   a. ORGANIZATION'S NAME

OR b. INDIVIDUAL'S LAST NAME    FIRST NAME    MIDDLE NAME c. MAILING ADDRESS    CITY    STATE | POSTAL CODE | COUNTRY

TAX ID/SS # | ADD'L INFO | ORG. TYPE | ORG. JURISDICTION | ORGANIZATION ID    ☐ NONE

8. AMENDMENT (COLLATERAL CHANGE): check only one box.
Describe collateral ___deleted or ___added, or give entire ___restated collateral description, or describe collateral ___assigned.

9. SECURED PARTY'S NAME
   a. ORGANIZATION'S NAME

OR b. INDIVIDUAL'S LAST NAME    FIRST NAME    MIDDLE NAME

10. OPTIONAL

FIG. 2c

UCC FINANCING STATEMENT AMENDMENT ADDENDUM
FOLLOW INSTRUCTIONS (front and back) CAREFULLY

11. INITIAL FINANCING STATEMENT FILE #

12. NAME OF PARTY AUTHORIZING THIS AMENDMENT
    a. ORGANIZATION'S NAME

OR
    b. INDIVIDUAL'S LAST NAME | FIRST NAME | MIDDLE NAME

13. ADDITIONAL INFORMATION

ABOVE SPACE IS FOR FILING OFFICE USE ONLY

FIG. 2d

UCC FINANCING STATEMENT ADDITIONAL PARTY
FOLLOW INSTRUCTIONS (front and back) CAREFULLY 19. NAME OF FIRST DEBTOR (1a or 1b) ON RELATED FINANCING STATEMENT
 a. ORGANIZATION'S NAME
OR
 b. INDIVIDUAL'S LAST NAME  FIRST NAME

20. MISCELLANEOUS

ABOVE SPACE IS FOR FILING OFFICE USE ONLY

21. ADDITIONAL DEBTOR'S EXACT FULL LEGAL NAME
 a. ORGANIZATION'S NAME
OR
 b. INDIVIDUAL'S LAST NAME | FIRST NAME | MIDDLE NAME
 c. MAILING ADDRESS | CITY | STATE | POSTAL CODE | COUNTRY
 TAX ID/SS # | ADD'L INFO | ORG. TYPE | ORG. JURISDICTION | ORGANIZATION ID | NONE

22. ADDITIONAL DEBTOR'S EXACT FULL LEGAL NAME
 a. ORGANIZATION'S NAME
OR
 b. INDIVIDUAL'S LAST NAME | FIRST NAME | MIDDLE NAME
 c. MAILING ADDRESS | CITY | STATE | POSTAL CODE | COUNTRY
 TAX ID/SS # | ADD'L INFO | ORG. TYPE | ORG. JURISDICTION | ORGANIZATION ID | NONE

23. ADDITIONAL DEBTOR'S EXACT FULL LEGAL NAME
 a. ORGANIZATION'S NAME
OR
 b. INDIVIDUAL'S LAST NAME | FIRST NAME | MIDDLE NAME
 c. MAILING ADDRESS | CITY | STATE | POSTAL CODE | COUNTRY
 TAX ID/SS # | ADD'L INFO | ORG. TYPE | ORG. JURISDICTION | ORGANIZATION ID | NONE

24. ADD'L SECURED PARTY'S or ASSIGNOR S/P'S NAME (12a or 12b)
 a. ORGANIZATIONS'S NAME
OR
 b. INDIVIDUAL'S LAST NAME | FIRST NAME | MIDDLE NAME
 c. MAILING ADDRESS | CITY | STATE | POSTAL CODE | COUNTRY

25. ADD'L SECURED PARTY'S or ASSIGNOR S/P'S NAME (12a or 12b)
 a. ORGANIZATIONS'S NAME
OR
 b. INDIVIDUAL'S LAST NAME | FIRST NAME | MIDDLE NAME
 c. MAILING ADDRESS | CITY | STATE | POSTAL CODE | COUNTRY

FIG. 2e

| 1. DEBTOR'S EXACT FULL LEGAL NAME | | | | | | |
|---|---|---|---|---|---|---|
| a. ORGANIZATION'S NAME | | | | | | |
| OR b. INDIVIDUAL'S LAST NAME | | FIRST NAME | | MIDDLE NAME | | |
| c. MAILING ADDRESS | | CITY | | STATE | POSTAL CODE | COUNTRY |
| TAX ID/SS # | ADD'L INFO | ORG. TYPE | ORG. JURISDICTION | ORGANIZATION ID | | ☐ NONE |
| 2. ADDITIONAL DEBTOR'S EXACT FULL LEGAL NAME | | | | | | |
| a. ORGANIZATION'S NAME | | | | | | |
| OR b. INDIVIDUAL'S LAST NAME | | FIRST NAME | | MIDDLE NAME | | |
| c. MAILING ADDRESS | | CITY | | STATE | POSTAL CODE | COUNTRY |
| TAX ID/SS # | ADD'L INFO | ORG. TYPE | ORG. JURISDICTION | ORGANIZATION ID | | ☐ NONE |
| 3. SECURED PARTY'S NAME | | | | | | |
| a. ORGANIZATION'S NAME | | | | | | |
| OR b. INDIVIDUAL'S LAST NAME | | FIRST NAME | | MIDDLE NAME | | |
| c. MAILING ADDRESS | | CITY | | STATE | POSTAL CODE | COUNTRY |
| 4. This FINANCING STATEMENT covers the following collateral: ONE CANON IR 9070 COPIER SYSTEM (S/N SKH01463) TWO CANON IR 5570 COPIER SYSTEMS (S/N SLQ04881 AND SLQ04803) | | | | | | |

FIG. 3

```
<FileDetail>
<TransType Type="Initial"/>
<FilingMethod Method="Paper"/>
<AmendmentType Type="NoType"/><AmendmentActionLoop><AmendmentAction
Action=""/></AmendmentActionLoop><AmendmentTypeLoop><AmendmentType Type=""/>
</AmendmentTypeLoop>
<OriginalFileNumber>0004060468</OriginalFileNumber><OriginalFileDate>20000203
0800</OriginalFileDate><PreviousFileNumber/><LapseDate>20100203</LapseDate>
<FileNumber>0004060468</FileNumber><FileDate>20000203 0800</FileDate>
<FilingOffice>CA</FilingOffice><ActionCode/><AltNameDesignation
AltName="NoAltType"/><AltFilingType Type="NOAltType"/>
<MiscInfo/>
<Debtors>
<DebtorName>
<Names>
<OrganizationName>ISHIKAWA AND OKITA, INC. DBA KEN'S TIRE AND
WHEEL</OrganizationName>
<MailAddress>3304 W BEVERLY BLVD</MailAddress><City>MONTEBELLO</City><State>
CA</State><PostalCode>90640</PostalCode><County/><Country>USA</Country>
<TaxID/><OrganizationType Type=""/><OrganizationJuris/><OrganizationID/>
<Mark/></Names><DebtorAltCapacity AltCapacity="NOAltCapacity"/></DebtorName>
</Debtors>
<Secured>
<Names>
<OrganizationName>YOKOHAMA TIRE CORPORATION</OrganizationName>
<MailAddress>POB 4550</MailAddress><City>FULLERTON</City><State>CA</State>
<PostalCode>92834</PostalCode><County/><Country>USA</Country><TaxID/>
<OrganizationType Type=""/><OrganizationJuris/><OrganizationID/><Mark/>
</Names>
</Secured>
<Collateral>
<ColText>
</ColText>
</Collateral>
<AuthorizingParty><AuthSecuredParty><OrganizationName/></AuthSecuredParty>
<AuthDebtor><OrganizationName/></AuthDebtor></AuthorizingParty></FileDetail>
```

PROSPECT ADDRESS INFORMATION

| | |
|---|---|
| Address: | 1055 WILSHIRE BLVD SUITE G 3 |
| City: | LOS ANGELES |
| State: | CA |
| Zip Code: | 90017-2431 |
| Phone: | |
| Current Business Listing: | Click Here (44) |

LENDER ADDRESS INFORMATION

| | |
|---|---|
| Lender Name: | Xerox Corporation |
| Address: | 1301 Ridgeview Bldg 300 |
| City: | Lewisville |
| State: | TX |
| Zip Code: | 75057 |
| Phone: | |
| Current Business Listing: | Click here |

EQUIPMENT INFORMATION

| | |
|---|---|
| Lease/Finance Start Date: | 2007-01-25 00:00:00 |
| Approximated Expiration Date: | 2012-01-25 00:00:00 |
| Equipment Description: | ONE (1) XEROX DC8860PC ONE (1) EXP6000 TOGETHER WITH ALL PARTS, ATTACHMENTS, ADDITIONS, REPLACEMENTS AND REPAIRS INCORPORATED IN OR AFFIXED THERETO. THIS FILING IS FOR PROTECTIVE PURPOSES ONLY. NOTHING CONTAINED IN THE FINANCING STATEMENT, NOR THE FILING THEREOF, SHALL BE DEEMED TO CONSTRUE THE LEASE, OR THE LEASING OF THE EQUIPMENT THEREUNDER, AS A CONDITIONAL SALE OR INSTALLMENT SALE AGREEMENT, A LEASE IN THE NATURE OF A SECURITY AGREEMENT OR ANYTHING OTHER THAN A TRUE LEASE OF PERSONAL PROPERTY. |
| Equipment Contract Information: | Embed Viewer (70) |

TERMS & CONDITIONS

1. The information provided by LeaseLogic, Inc. is exclusively provided to you for your own use and may not be transferred to any other party. LeaseLogic, Inc. expressly disclaims all warranties associated with the provision of this information, and makes no representation as to the accuracy or timeliness.
2. This information is believed to be accurate but is not guaranteed.
3. It is a violation of both federal and state law to transmit an unsolicited advertisement to a facsimile machine, or to call consumers that are on a do not call list. Any person violating such laws may be subject to civil and criminal penalties. We provide business information for lawful purposes and expressly forbid the use of our business information in any unlawful manner.

Modify Search    New Search

FIG. 6a

METHODS OF SEARCHING PUBLIC INFORMATION FOR SALES LEADS

CROSS-REFERENCE TO RELATED APPLICATIONS

This application is a continuation of U.S. application Ser. No. 12/202,893, filed Sep. 2, 2008, which claims priority to U.S. Provisional Patent Application Ser. No. 60/967,153, filed on Aug. 31, 2007, the disclosures of which are incorporated by reference herein in its entirety.

FIELD OF THE INVENTION

This invention relates to identifying prospects, specifically to an improved method of identifying prospects for companies involved in the distribution, sales, and financing of productive assets.

BACKGROUND OF THE INVENTION

For companies that depend on selling productive assets, otherwise known as business equipment, it is advantageous to know which potential customers are most likely to purchase such equipment. Productive assets can be described as any piece of equipment that is designed to allow a business to conduct operations. Examples include agricultural equipment, automotive tools & equipment, computer equipment, construction equipment, office machines such as copiers and fax machines, dental equipment, excavation equipment, gym equipment, manufacturing equipment, medical equipment, recreation equipment, restaurant equipment, telephone systems, trucking equipment, vending machines, woodworking equipment, construction equipment such as graders and haulers, and other more specialized equipment such as satellite receivers or network servers.

Productive assets usually have long established markets with a few major manufactures and a vast array of distribution channels and sales strategies. Business equipment also tends to be of a high dollar value, and is very often leased or financed instead of purchased outright. According to the Equipment Leasing Finance Association (ELFA) $600 billion dollars of capital expenditures are financed in the United States every year. Nearly half of that total, over $250 billion, is for equipment leases. It is also estimated that over 80% of U.S. businesses lease all or some of their equipment. Most of the time business equipment is sold or leased to customers that are already using older equipment of a similar nature. Thus, it is important for business equipment sellers to know what equipment their potential customers are currently using. However, there is currently no simple way to check what type of equipment any one company uses.

Business equipment sellers currently attempt to find potential customers by asking the companies in their market about the equipment they are using, and when their lease may be expiring. They then may keep track of this information. The most popular way to do this is by implementing a Customer Relationship Management (CRM) database system. Sales people will manually type the leasing information that they obtain into a database where it can be stored, organized, and manipulated. The main disadvantage to this method is that it takes a large amount of human capital to obtain, and enter this information into a CRM database.

Sales people must attempt to find the companies that are most likely to buy new equipment. A further disadvantage to the current method is that a great deal of man-hours are required to find the prospects most likely to buy. Sales people must find potential buyers who currently use, or need the type of equipment that they sell. Then they must try and figure out when these potential buyers will be ready to buy new equipment. Another disadvantage to this method is that some potential buyers will not be identified, because these sales people are really guessing about who may need new equipment.

Given current methods, there is a need for an efficient way to identify customers of productive assets.

SUMMARY OF THE INVENTION

Accordingly, it is a primary object of the present invention to provide a method of identifying potential buyers by analyzing what type of equipment they are currently using.

It is a further object of the invention to provide a method that takes advantage of the large amount of collateral information that is disclosed in UCC financing statement data.

It is an additional object of the invention to provide a method that takes advantage of the large amount of collateral information that is disclosed in UCC financing statement images by using an Optical Character Recognition (OCR) process.

It is an additional object of the invention to provide a method that takes advantage of collecting collateral information that is not disclosed in the UCC financing statement data or images by contacting debtors and manually entering collateral information into a relational database.

It is an additional object of the invention to provide a method that takes advantage of a relational database that is populated with collateral information so that UCC financing statements can be identified by equipment specific keywords.

It is another object of the invention to provide a method that takes advantage of grouping equipment specific keywords so that UCC financing statements can be identified by a group of related equipment specific keywords.

These objects and advantages are attained by a method that gives publicly disclosed UCC financing data, and images a new use. The present invention puts UCC data and images through an innovative process, which allows for the identification and display of potential buyers for particular types of productive assets. The present invention takes UCC financing information through a unique process in order to provide valuable information to equipment sellers such as: who their competitors' customers are, what equipment their competitors' customers are using, and when their competitors' customers started leasing their equipment. This is made possible by creating a relational database that is searchable by collateral information. A user may search our database by easily entering keywords relating to the type of equipment that they sell, and get results based on that criteria.

The present invention gives business equipment sellers strategic advantage over their competitors, and the information needed to increase their profits substantially. Currently businesses attempt unsuccessfully to obtain certain information from UCC financing statements, and the present application describes efficient methods for doing so. Current methods take a huge amount of human capital and other resources and the information that equipment sellers obtain is likely inaccurate. The methods described herein allow business equipment sellers to easily pinpoint their position and that of their competitors in a specific region and apply human capital more efficiently. Most equipment sellers are not entirely aware of the public disclosure practices and requirements of equipment leasing information. When equipment sellers are aware of this information, they cannot find the information in a helpful format because it is currently not being provided.

The current disbursement of this information is not efficient, because it is contained in databases that are not designed for easy retrieval and dsearching. In order to make the information useful to equipment sellers the present application presents a number of methods.

For instance, the present application provides a method of identifying customers of productive assets comprising machine-searching a UCC financing statement and collecting collateral information and corresponding party information into discrete records. The records are then organized by collateral information to identify the corresponding party information. Desirably, the UCC financing statement includes markup language data and images, and the step of collecting includes converting the images to a searchable digital text form and combining with the corresponding markup language data in a record. In one embodiment, the step of collecting includes linking the images to the combined images in searchable form and the markup language data.

The collateral information fields in the UCC financing statements may be filled with either markup language data, images, or no information. Consequently, the step of collecting collateral information includes at least automatically retrieving the markup language data as well as converting the images to a searchable digital text form, and entering the collateral information into the respective records. Furthermore, the step of collecting may include flagging those UCC financing statements that contain no information in their collateral information fields and manually obtaining collateral information for those UCC financing statement transactions and entering the collateral information into the respective records.

Preferably, the step of organizing includes keyword mapping the collateral information into particular equipment specific categories. The UCC financing statement may include initial filing information and addendum information, and the method further includes adding the addendum information to the initial filing information to create a single record. The UCC financing statement may also include amendment information, and the method further includes overriding the initial filing information with the addendum information to create a single record. The method desirably presents the records in a format with hyperlinks for the collateral and party information.

Another method described herein identifies customers of productive assets. The method includes machine-searching a number of public financing statements filed for lease/finance transactions. The party information from each financing statement is recorded, and a collateral information image from a collateral field within each financing statement is scanned. An Optical Character Recognition (OCR) process is performed on the image to derive digital text representing the collateral information. Finally, the collateral information is organized in conjunction with the corresponding party information into records in a searchable database. The step of organizing may include keyword mapping the collateral information into particular equipment specific categories. Typically, the financing statement includes initial filing information and addendum information, and the method further includes adding the addendum information to the initial filing information to create a single record. The financing statement may also include amendment information, and the method further includes overriding the initial filing information with the addendum information to create a single record. The method may further include presenting the records in a format with hyperlinks for the collateral and party information, such as a web-based interactive map.

A method of informing providers of productive assets described herein comprises machine-culling a database of public financing statements to identify particular productive assets from any collateral information fields in the statements. The results of the machine-culling are organized and corresponding party and collateral information from the public financing statements sorted into the particular productive asset categories. The method further may include identifying UCC filings by querying populated collateral fields with a particular set of keywords that relate to the particular productive asset categories. The results of the queries may be "tagged" in order to put filings into the particular productive asset categories. Desirably, the step of machine-culling includes identifying keywords that are contained in the collateral information fields. The method preferably also includes presenting the records in a format with hyperlinks for the collateral and party information; for instance hyperlinks that lead to a web-based interactive map.

A further understanding of the nature and advantages of the present invention are set forth in the following description and claims, particularly when considered in conjunction with the accompanying drawings in which like parts bear like reference numerals.

BRIEF DESCRIPTION OF THE DRAWINGS

The invention will now be explained and other advantages and features will appear with reference to the accompanying schematic drawings wherein:

FIG. 2a is an image of a UCC National Financing Statement form (Form UCC-1);

FIG. 2b is an image of a UCC National Financing Statement Addendum form (Form UCC-1Ad);

FIG. 2c is an image of a UCC National Financing Statement Amendment form (Form UCC-3);

FIG. 2d is an image of a UCC National Financing Statement Amendment Addendum form (Form UCC-3Ad);

FIG. 2e is an image of a UCC National Financing Additional Party form (Form UCC-1AP & UCC-3 Ad);

FIG. 3 is a UCC sample partial TIFF image that is filled out;

FIG. 4 is a sample of a typical TIFF initial filing coded in XML;

FIG. 5b is an example of a search query web page form;

FIG. 6a is a screenshot of the details web page that is returned; and

DETAILED DESCRIPTION OF THE PREFERRED EMBODIMENTS

Figure 1:
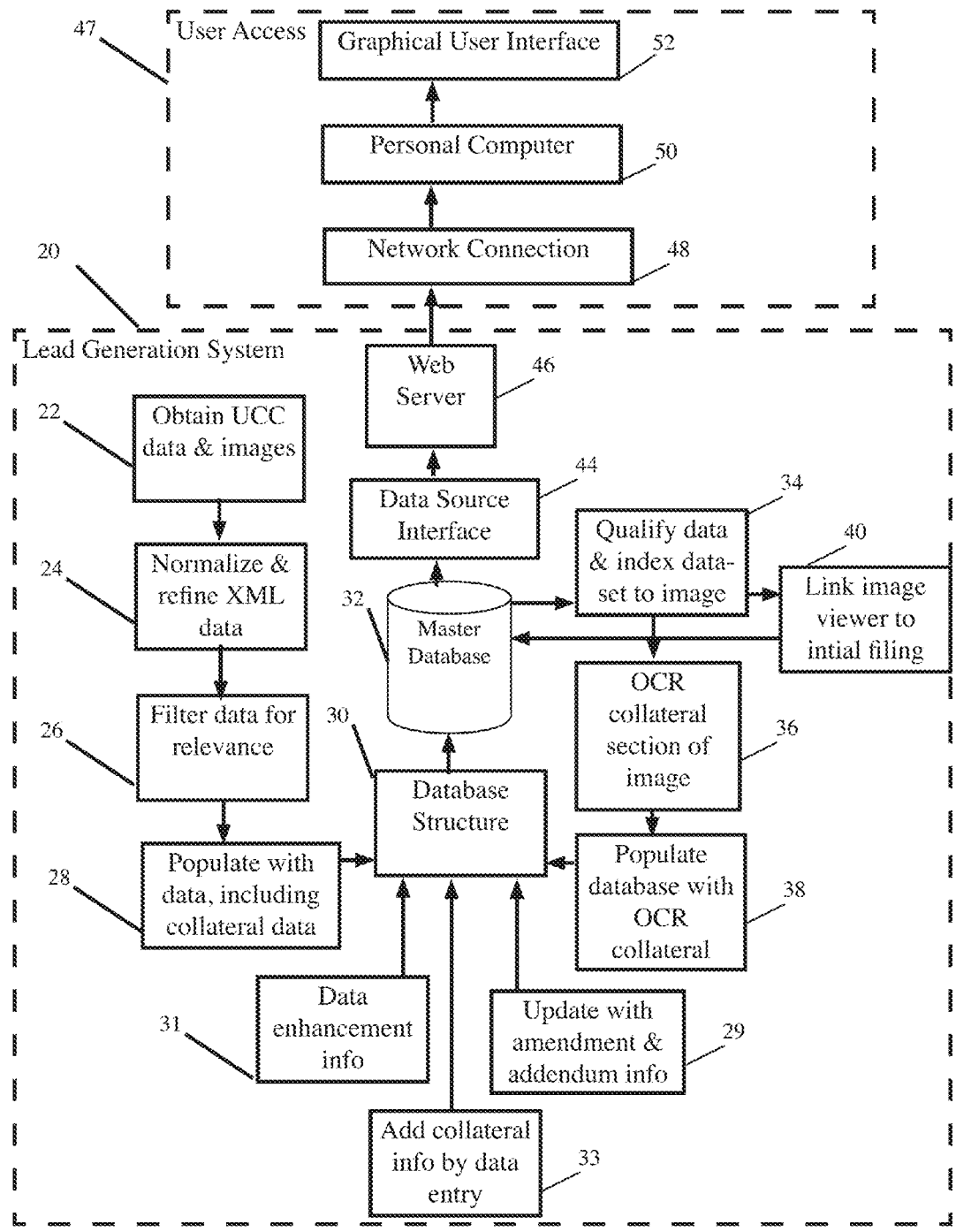
FIG. 1 is a diagram flowchart that shows the process that data & images go through to get into the database.

The invention will be understood more fully from the detailed description given below and from the accompanying drawings of preferred (but not exclusive) embodiments of the invention: which, however, should not be taken to limit the invention to a specific embodiment but are for explanation and understanding only. Those of ordinary skill in the art will appreciate that the present invention, while described below in connection with its use over the Internet is certainly not limited thereto. Accordingly, the following preferred embodiment of the invention is set forth without the loss of generality to, and without imposing limitations upon, the claimed invention.

The present invention provides methods of identifying potential buyers of productive equipment by analyzing what type of equipment they are currently using. The methods takes advantage of the large amount of collateral information that is disclosed in Uniform Commercial Code (UCC) financing statement data. In general, however, the present invention is useful for organizing and re-presenting information culled from "public financing statements" in general, whether they be various UCC statements or other such statements that are filed with public agencies.

The UCC is one of a number of uniform acts that have been promulgated in conjunction with efforts to harmonize the law of sales and other commercial transactions in all 50 states. The UCC deals primarily with transactions involving personal property (movable property), not real property (immovable property). As the product of private organizations, the UCC is not itself the law, but only recommendations of the laws that should be adopted. Once enacted in a state by the state's legislature, it becomes true law and is codified into the state's code of statutes. In one form or another, the UCC has been enacted in all of the 50 states, and thus its rules may be considered essentially national in scope.

Article 2A of the UCC requires that lessors (secured parties) and lessees (debtors) make available to the public their equipment leasing information in the form of a financing statement. The UCC financing statements record and protect a secured party's interest in the collateral offered by a debtor for a loan. A financing statement is filed to perfect a security interest in named collateral and establishes priority in case of debtor default or bankruptcy. The UCC system gives public notice of the debtor-secured party relationship and the collateral involved. This information is deemed public because the Government believes that potential lenders have the right to review a potential borrower's debt history. These filings are also used to put financial liens on debtors that fail to fulfill their debt obligations.

Despite these requirements, it is currently very difficult to find and use UCC lease information to identify high propensity buyers. The UCC regulates the disclosure requirements of financing information, but the disbursement of this information is done on a state-by-state basis. The UCC financing information is publicly available in data formats such as ASCII, XML, or TXT, among others. Images from UCC financing statements are available in such formats as TIFF, PDF, JPEG, among others.

The current available databases that allow the searching of UCC financing statements are very limited. Most states allow the public to search their UCC database, however due to the nature of the data entering techniques, and the construction of state databases, searches are very limited in their usefulness. For example, California has a UCC database (https://uccconnect.sos.ca.gov/acct/acct-login.asp) similar to many other states. This database can only be searched by a few criteria, mainly debtor name, secured party name, and filing number, but not collateral type.

Some third party services attempt to use UCC financing statements to provide general sales leads. These companies predict collateral type by classifying secured party names. Secured parties are usually banks or equipment leasing companies, but a secured party might also be a captive leasing company. Captive leasing companies are usually large equipment manufacturers that have their own leasing branches, thus the secured party name will be the name of the equipment manufacturer. This database simply takes the secured party name and by using that name, they make an assumption about the type of collateral. This method is not good at identifying potential buyers of particular productive assets because it does not actually search collateral information but rather the secured party name. In addition, the equipment vendors, or dealerships, that sell the equipment rarely finance the equipment. Equipment dealers may construct the equipment lease, but it is usually a bank or a general equipment leasing company that does the actual financing and is listed as the secured party. Thus, the secured party name may have no correlation with the equipment type. This method does not analyze what type of equipment is listed as collateral in UCC financing statements, and therefore many potential customers will not be identified using this method.

For the purpose of the present application, "collateral information" refers to any information pertaining to collateral assets that are identified in UCC financing statements. Such information may include the type of asset (copier, forklift), the size or capacity of the item, manufacturer of the item, etc.

"Party information" in relation to UCC financing statements includes any identifying information provided on the various UCC forms for the parties involved in the transaction. For lease/finance transactions, the parties may be the lessor (secured party), the lessee (debtor), or a third party to the contract. The information may include the names of the parties, primary or surrogate, addresses, etc.

"Providers" of productive assets are those involved in the sales, leasing, or financing of productive assets.

In the context of the present invention, the terms "machine-culling," "machine-searching" and the like refer to non-manual (automatic) steps for processing information. The steps are typically performed by a computer program that receives a body of information, such as a financing statement, and performs a series of operations on that information. For instance, software may be designed to read and record every field within a particular financing statement, such as any of the UCC statement described herein. Or, software may be used to query one or more fields in a financing statement, such as a collateral field, for particular words or images. Furthermore, the program may be designed to apply an Optical Character Recognition (OCR) process to one or more fields in the financing statement which typically includes text images as opposed to machine-readable text.

Machine-readable text may be markup language such as the American Standard Code for Information Interchanges (ASCII) or Extensible Markup Language (XML), or other digital text format that may be searched (that is, without any further conversion such as OCR).

The present invention provides a method of generating a useful sales lead database by using UCC data and images. This can be performed by following the steps that are shown in FIG. 1. First the data & images are obtained at 22 from the proper state authority, usually the Secretary of State. There are standard federal regulations about how UCC financing data & images should be processed and stored, however each state may vary slightly. The invention is not limited by the particular format of financing statement, the various data & image formats that are available are generally similar across the states.

There are several different types of UCC filings, including but not limited to the following: UCC-1 (see FIG. 2(a)), UCC-1Ad (see FIG. 2(b)), UCC-1AP (see FIG. 2(e)), UCC-3 (see FIG. 2(c)), UCC-3Ad (see FIG. 2(d)), UCC-3AP (see FIG. 2(e)), UCC-5, JL-1, JL-3, AT-1, AT-3, and UCC-11. For the purposes of our invention we are mainly interested in all forms that have the UCC-1, or UCC-3 prefix.

We first collect all of the publicly available data and image from the Secretary of State (SS), as at 22 in FIG. 1. These data and images are taken from the forms that are filed with the SS either electronically, or by paper. If they are filed electronically then the filer fills in all of the appropriate information and it can easily be converted into a markup language such as the American Standard Code for Information Interchanges (ASCII) or Extensible Markup Language (XML). However, if the filing is filed on paper then much of the data must be entered by the SS manually in order to get the data into digital form. The Secretary of State enters all of the important data with the exception of collateral information, as seen in FIG. 3 at 35. This is mainly because the collateral information can be a large amount of information and given by the filer in slightly different formats. For example the filer has the option to attach additional pages of collateral information to an initial filing UCC-1 (see FIG. 2(*a*)). Thus, the paper filings are scanned and turned into images. These images in some cases, such as in California, take the form of a Tagged Image File Format (TIFF).

Figure 6B:
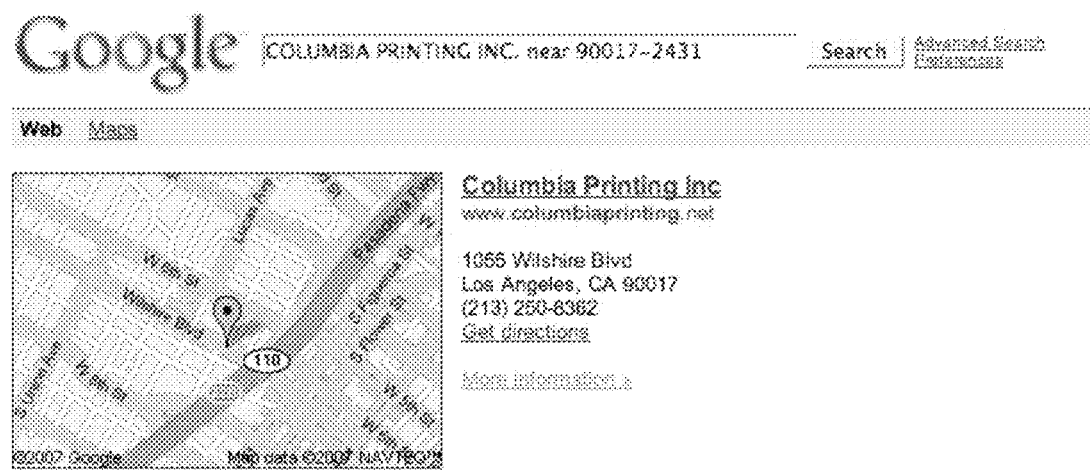
FIG. 6b is a screenshot of a Google earth map for the contact hyperlink.

The TIFF images may then be indexed to the XML data so that the user of the present invention can easily search in the master database 32 and look up files by certain criteria through a search form (see FIG. 6(*a*)), and then link to view the appropriate image. By processing images from financing statements and deriving information from those images, the collateral information is converted into an easily searchable form, such as XML. It is also possible to connect both the derived XML data with the original image if desired, so that a user can search and easily sort particular collateral information, but also see the original filing for verification or other purposes.

Once the data and images are collected the XML data 24 can be normalized and refined. This is done by writing a script that parses the data and pushes it into database form. Data that contains the prefix UCC-1 or UCC-3 may be filtered, as at 26 in FIG. 1, in order to work with just UCC-1 filings for example. Primarily filings that have the prefix UCC-1 and UCC-3 will have the response NoAltType for the data category of AltFiling Type as shown in FIG. 4.

Figure 5A:
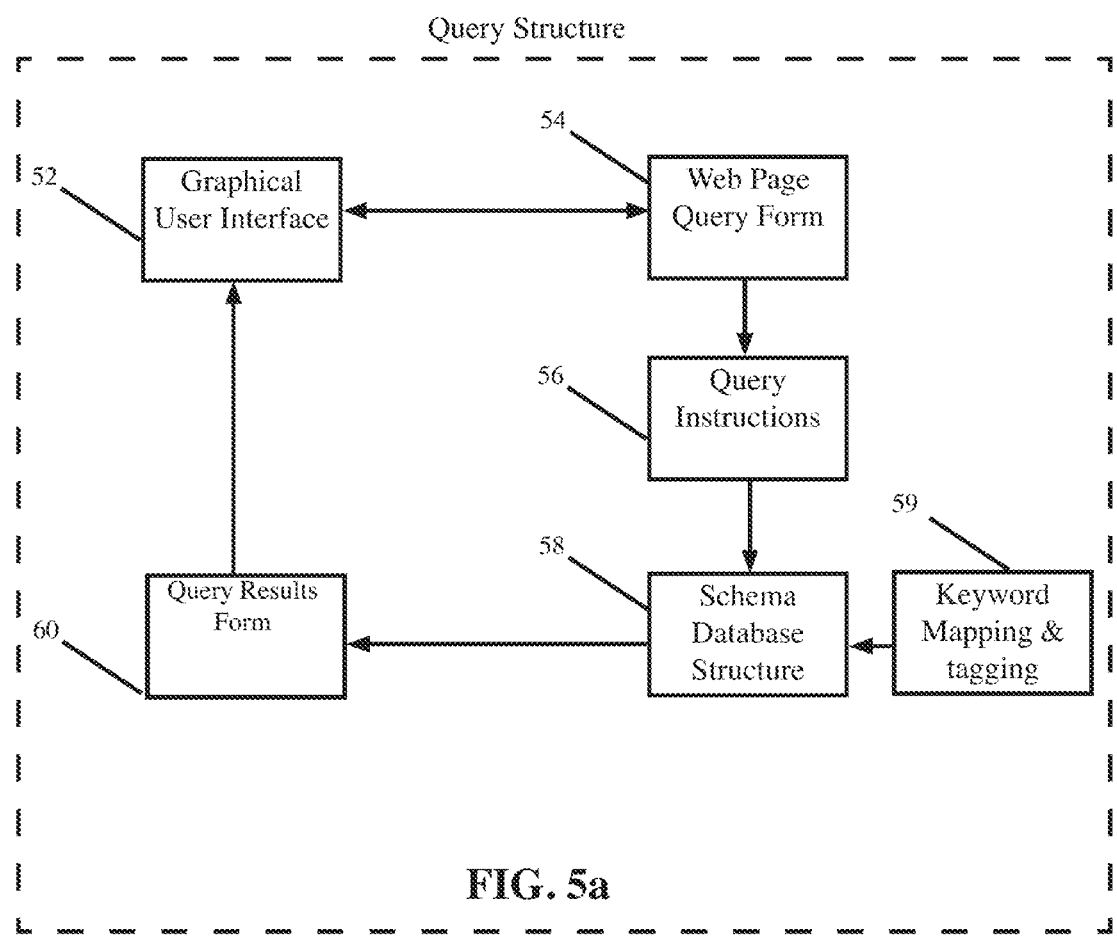
FIG. 5a is a flowchart that shows how the database is queried.

The database structure 30 can then be populated as at 28 with the data that was normalized in step 24. This includes the collateral information that is contained within the UCC financing data. Usually if there is collateral information in the data it means that the UCC financing statement was electronically filed. This collateral data can be queried through the graphical user interface FIG. 5*a*, such as at 52, as well as with keyword mapping with FIG. 5*a*, as at 59.

Keyword mapping such as shown in FIG. 6*a* at 59 is useful in categorizing filings into particular equipment specific categories. For example, to create the category for copiers we must put a list of keywords together that are comprised of equipment type names, and brand names that are unique to copiers. Then we query the collateral section of the database (i.e., after images have been converted to searchable form) for those keywords and get the result. The resulting records can then be tagged and included in the copier category. This can be performed for a vast number of equipment categories. It is also important to note that the categorizations are not mutually exclusive. In other words, a filing may have collateral information that contains keywords for both copier equipment, and manufacturing equipment. In this case the filing would be in both the copier category, as well as the manufacturing equipment category. The process involves machine-culling a database of filed public financing statements to sort out particular productive assets from any collateral information fields in the statements. The results of party and collateral information are sorted into particular productive asset categories, or more than one such category.

It is important to understand that the Secretary of State simply archives all filings, and thus an initial filing is not treated as a living document that is ever altered, but rather one in a series of different documents that must be filed. So when a filer wants to amend their initial filing they must file an addendum or amendment, such as the forms shown in FIG. 2(*b*)-(*e*). When an amendment or addendum is filed it must reference an original filing number, which is given upon an initial filing, and thus there will be multiple filing numbers that all reference the same original filing number. The methods described herein contemplate updates to initial filings, such as shown in FIG. 1 at 29, and merge, and or override the information contained in the initial filing. When an addendum is filed FIG. 2(*b*) & FIG. 2(*d*) the methods add the addendum information to the initial filing information in the searchable database. When an amendment FIG. 2(*c*) is filed the methods override the information that is contained in the initial filing with the amendment information in the database. This is done by matching the original filing number of initial filings with the amendments and addendums and then updating the appropriate fields in the database, such as at 30 in FIG. 1.

This updating procedure updates more than just initial filings. Every amendment that is filed has the potential of overriding the last. Thus, the initial filing information that has been talked about can be added to and changed multiple times depending on how many addendums and or amendments that are filed. Updating this information is especially important because it allows the user of the database to get accurate results without having to review multiple filings. This process allows the user of the invention to get the most relevant information with the least amount of effort, and is currently only available through a labor-intensive process.

Once the data has been put through the aforementioned processes, additional data enhancement information 31 may be collected. Data enhancement information (not the same as "party information") may include information such as telephone numbers and industry codes for the debtors. This is done by referencing the debtor contact information from the UCC financing statements and appending it with the appropriate enhancement information in an existing database from a third party. This information is then uploaded into the searchable database. This is an automated process that is performed by writing a simple software script. A person with ordinary skill in the art will appreciate that this may be done in many different programming languages. Furthermore, other data enhancement information may be taken from outside sources and uploaded into the master database 32.

All of the information may populate the master database 32 through the database structure shown in FIG. 1. This information is organized and put into the profile database 22 for easy retrieval. Once the XML data as seen in FIG. 4 has been put through the described steps, the data can be qualified and indexed to the appropriate image, as at 34 in FIG. 1. At this point we want to qualify data that has collateral information contained in UCC financing images that needs to be run through the OCR process 36. This includes any or all forms, such as in FIG. 2(*a*)-(*c*), that have a collateral section on them. However, it should be noted that the most collateral data typically comes from the initial filing form box #4, as in FIG. 3 at 35. The collateral data will also come from the additional pages that are attached to the initial filings. Thus we qualify the data and use the given index to retrieve those images.

Then the collateral sections from the qualified images are processed with OCR software 36. This can be done with many different OCR software applications, some of which are Microsoft OCR, Omini, Abbyy, among others. The OCR engine is able to run through the qualified images and turn the collateral image text into collateral digital text. From here it can be uploaded in order to populate the database with the OCR collateral results 38. It is then put into the regular database structure 30. For instance, the results for box #4 at 35 in FIG. 3 can be put in the Col_Text section of the database. This is the same collateral section that will already have been populated from purely electronic filings.

If there is no collateral information contained in the data or image for initial filings then these filings can be enhanced by human data entry 33. This is performed by contacting the debtors and asking them for the collateral information. It can then be added to the database 30 by manually typing the information into a data entry form.

The method may also include appending the party information from records in existing databases that contain general business information such as: contact names, contact job titles, number of employees, fax, phone, revenues, SIC codes, websites, etc. Though these databases do not contain collateral information, that can be manually added to the record later and the outcome combined with other records of party and collateral information for a more complete searchable database.

There will also be an image viewer 40 that will allow the user to view the actual TIFF images that are associated with the corresponding data. The present invention provides for an image viewer that will allow the user to view any initial filing. First, all initial filings that are only one page long will preferably be purged after going through the OCR process. This is because once the OCR procedure is performed on box #4 at 35 in FIG. 3, there won't be any information on the image that is not in the database 32. Images that are longer than one page will be retrievable. The present invention preferably modifies the image type from a TIFF to PDF file type. This can be done with many different libraries or programs.

The present invention also modifies the appearance of the images in order to make them more presentable and to block certain information that may not be relevant for the user to see. This is done because it makes UCC financing statement images easier to read. There are several ways that this can be done. The first is to process all of the images on the back-end, modifying them to preference before allowing the user to pull up the image via hyperlink, as seen at 70 in FIG. 6(*a*). Alternatively, one may construct an image viewer that converts the images after the user clicks on the hyperlink 70. One may also lay over the original image and block the user from seeing the irrelevant information using a program such as Adobe Flash. However, a person with ordinary skill in the art will appreciate that there are many options to achieve the results. These images are linked into the profile database 30. When a user clicks the equipment contract link 70 in the detail sheet FIG. 6(*a*) the user is taken to the proper image to view.

When a user of the proposed method makes a request by using the graphical user interface 52, a signal is generated back to the data source interface 44, describe in more detail below. This is preferably in the form of a HTTP request sent over the Internet using TCP/IP and possibly a Secure Socket Layer (SSL). The request may be routed through the network connection 48 and through web server 46 to the data source interface 44. It will be appreciated that the details of HTTP operation in conjunction with the TCP/IP and SSL are well known to those of ordinary skill in the art and will not, therefore, be further described.

When the HTTP request is received, the data source interface 44 may access the master database 32 to retrieve the requested information. In one embodiment of the invention, a common gateway interface (CGI) interface, well known to those of the skill in the art, may be used. When the master database 32 in FIG. 1 is accessed by the user through a personal computer 50, the proposed Common Gateway Interface (CGI) program acts as an interface between the web server 46 and/or data source interface 44 by executing a set of instructions. The interaction of web servers and CGI programs and the sending of information there between is well known to those of ordinary skill in the art. The CGI program may extract the document information from the information passed to it by the server and retrieve the appropriate information from the master database 32. This may be accomplished in a number of ways known to those of ordinary skill in the art. For example, the CGI program may be a database access module of one of a number of commercial available relational database applications. Examples of such databases include Oracle, Sybase, SQL, MySQl, Server, and the like. It is also possible for these systems to be accessed directly by the web server 46 using their own internal data engines.

Figure 5B:
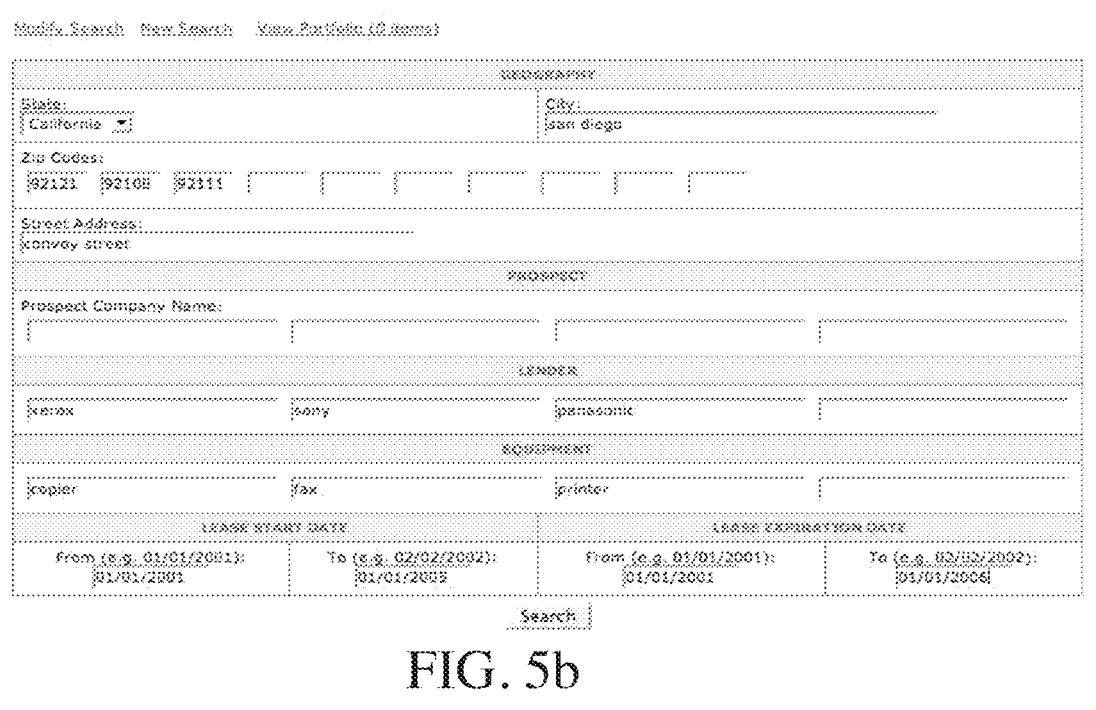
Figure 5C:
FIG. 5c is a screenshot of the query results web page.

FIG. 5(*a*)-(*c*) illustrate the query structure of the present invention. It will be appreciated by those of ordinary skill in the art that the query structure could be arranged a number of ways. FIG. 5(*a*) shows through the use of the Graphical User Interface (GUI) 52 how the user may fill out a Web Page Query Form 54, shown in more detail in FIG. 5(*b*). This form will be translated into a set of Query Instructions 56. The Query Instructions 56 enter the Schema Database Structure 58, shown in more detail in FIG. 5(*b*). The database provides results to the user in the form of a Query Results Web Page, shown in more detail in FIG. 5(*c*). These results are returned back to the user through the Graphical User Interface FIG. 1, 52.

The user can then click on any particular company name as at 62 in FIG. 5(*c*) to see a details page FIG. 6(*a*). The user may also click the phone hyperlink 64 to be taken to a map page FIG. 6(*b*) (such as an interactive Google map) which automatically will search for a business listing by company name 62 and zip code. This map hyperlink 64 is also available on the details page FIG. 6(*a*). The user may also click any of the boxes 66 that are located on the Query Results Web Page FIG. 5(*c*) and click the add to portfolio button 65. This will put all the user-selected results onto a new page, which will be saved in their account.

While the invention has been described in its preferred embodiments, it is to be understood that the words which have been used are words of description and not of limitation. Therefore, changes may be made within the appended claims without departing from the true scope of the invention.

What is claimed is:

1. A method of identifying customers of productive assets, comprising:
 machine-searching a plurality of Uniform Commercial Code financing statements that each includes a field for collateral information on specific productive assets that are supplied as collateral for a transaction underlying the financing statement, and corresponding party information of the collateral information, wherein corresponding collateral information fields in the financing statements are filled with either markup language data, images, or no information;
 machine-collecting the collateral information and the corresponding party information of each financing statement into respective records, including:
 in response to detecting the corresponding collateral information fields containing the markup language data, automatically retrieving the markup language data and entering the markup language data into the respective records, in response to detecting the corresponding collateral information fields containing the images, automatically converting the images to a searchable digital text form and entering converted searchable digital text form into the respective records, and in response to detecting the corresponding collateral information fields containing no information, automatically flagging the financing statement to a user, manually obtaining, by the user, collateral information, and automatically entering the obtained collateral information into the respective records; and machine-organizing the respective records by the collateral information to identify the corresponding party information, including keyword mapping the collateral information into particular equipment specific categories.

2. The method of claim 1, wherein the step of machine-collecting includes converting any images in any one of the respective records to the searchable digital text form and combining the converted searchable digital text form with corresponding markup language data in that record.

3. The method of claim 2, wherein the step of machine-collecting includes linking the images to the converted images in the searchable digital text form and the corresponding markup language data.

4. The method of claim 1, wherein the step of keyword mapping the collateral information into the particular equipment specific categories includes linking both names of a particular equipment type and brand names of manufacturers of the particular equipment type into any one particular equipment specific category.

5. The method of claim 1, wherein each financing statement includes initial filing information and addendum information, and the method further includes adding the addendum information to the initial filing information to create a single record.

6. The method of claim 1, wherein each financing statement includes initial filing information and addendum information, and the method further includes overriding the initial filing information with the addendum information to create a single record.

7. The method of claim 1, further including presenting the respective records in a format with hyperlinks for the collateral information and the corresponding party information.

8. The method of claim 7, wherein one of the hyperlinks for the corresponding party information includes a web-based interactive map.

9. A method of identifying customers of productive assets, comprising:

machine-searching a number of Uniform Commercial Code financing statements filed for finance transactions wherein at least some of the financing statements include an image within a field for collateral information on specific productive assets that are supplied as collateral for a transaction underlying a particular financing statement, and corresponding party information of the collateral information;

machine-recording the corresponding party information from each financing statement;

machine-retrieving the collateral information image from the field within the at least some of the financing statements and performing an Optical Character Recognition (OCR) process on the retrieved collateral image to derive digital text representing the collateral information;

machine-organizing the collateral information in conjunction with the corresponding party information into records in a searchable database, including keyword mapping the collateral information into particular equipment specific categories; and machine-presenting the records in a format with hyperlinks for the collateral information and the corresponding party information, wherein one of the hyperlinks for the corresponding party information includes a web-based interactive map.

10. The method of claim 9, wherein the step of keyword mapping the collateral information into the particular equipment specific categories includes linking both names of a particular equipment type and brand names of manufacturers of the particular equipment type into any one particular equipment specific category.

11. The method of claim 9, wherein each financing statement includes initial filing information and addendum information, and the method further includes adding the addendum information to the initial filing information to create a single record.

12. The method of claim 9, wherein each financing statement includes initial filing information and addendum information, and the method further includes overriding the initial filing information with the addendum information to create a single record.

13. The method of claim 9, further including presenting the records in a format with hyperlinks for the collateral information and the corresponding party information.

14. The method of claim 9, wherein one of the hyperlinks for the corresponding party information includes a web-based interactive map.

15. A method of informing providers of productive assets, comprising:

machine-culling a database of Uniform Commercial Code financing statements that each includes a field for collateral information on specific productive assets that are supplied as collateral for a transaction underlying the financing statement, and a secured party field with secured party information, wherein the machine-culling including identifying productive asset keywords that are contained in corresponding collateral information fields; and machine-organizing output from the step of machine-culling by sorting corresponding secured party information and collateral information including the identified productive asset keywords from the Uniform Commercial Code financing statements into particular productive asset categories, wherein each financing statement includes initial filing information and addendum information, and the method further includes adding the addendum information to the initial filing information to create a single record.

16. The method of claim 15, further including identifying Uniform Commercial Code filings by querying corresponding collateral information fields with a particular set of keywords that relate to the particular productive asset categories.

17. The method of claim 16, further including placing the filings into the particular productive asset categories.

18. The method of claim 15, wherein the step of machine-organizing includes sorting the corresponding secured party information and the collateral information from the financing statements into particular secured party categories, and further including identifying Uniform Commercial Code filings by querying secured party fields with a particular set of names that relate to a particular secured party category.

19. The method of claim 15, further including presenting the records in a format with hyperlinks for the collateral information and the secured party information.

20. The method of claim 15, further including presenting the records in a format with hyperlinks for the collateral information and the secured party information, and wherein one of the hyperlinks for the secured party information includes a web-based interactive map.

* * * * *